US006883547B1

(12) United States Patent
Jorgensen

(10) Patent No.: US 6,883,547 B1
(45) Date of Patent: Apr. 26, 2005

(54) PLUG FOR HEAT EXCHANGER TUBES

(75) Inventor: Glenn F. Jorgensen, Ridgewood, NJ (US)

(73) Assignee: JNT Technical Services, Inc., Little Ferry, NJ (US)

( * ) Notice: Subject to any disclaimer, the term of this patent is extended or adjusted under 35 U.S.C. 154(b) by 0 days.

(21) Appl. No.: 10/412,570

(22) Filed: Apr. 11, 2003

(51) Int. Cl.$^7$ .............................................. F16L 55/10
(52) U.S. Cl. ....................... 138/89; 165/171; 220/234
(58) Field of Search ....................... 138/89; 220/234; 165/71; 29/253

(56) References Cited

U.S. PATENT DOCUMENTS

| | | | | |
|---|---|---|---|---|
| 3,135,414 | A | * | 6/1964 | Leighton .................... 220/235 |
| 4,246,811 | A | * | 1/1981 | Bondhus et al. ............... 81/436 |
| 4,310,029 | A | * | 1/1982 | Dudek .......................... 138/89 |
| 4,474,216 | A | * | 10/1984 | Noe ............................. 138/89 |
| 4,531,550 | A | * | 7/1985 | Gartner ........................ 138/89 |
| 4,535,658 | A | * | 8/1985 | Molinari .................. 81/177.85 |
| 4,653,540 | A | | 3/1987 | Epstein |
| 4,982,763 | A | * | 1/1991 | Klahn .......................... 138/89 |
| 5,094,809 | A | * | 3/1992 | Lenoble et al. ............. 376/206 |
| 5,194,214 | A | * | 3/1993 | Snyder et al. .............. 376/203 |
| 5,249,604 | A | * | 10/1993 | Keating ........................ 138/89 |
| 5,255,717 | A | * | 10/1993 | Nelson et al. ................ 138/89 |
| 5,289,851 | A | * | 3/1994 | Jorgensen .................... 138/89 |
| 5,456,290 | A | * | 10/1995 | Haberman et al. ............ 138/89 |
| 5,560,394 | A | * | 10/1996 | Jorgensen .................... 138/89 |
| 5,865,214 | A | * | 2/1999 | Stearns ........................ 138/89 |
| 6,116,285 | A | * | 9/2000 | Wilson ........................ 138/89 |
| 6,302,001 | B1 | | 10/2001 | Karle |

OTHER PUBLICATIONS

MagicRing Production Insert Bits—Wiha MagicRing Saves Time, *Wiha Quality Tools;* http://www.wihatools.com/713inchMR.htm, Dec. 23, 2002.
Torque Wrench and Screw Grab, *Torque Wrench: Screw Grab by Torq'N Seal,* http://www.torq-n-seal.com/access.htm, Dec. 23, 2002.

* cited by examiner

*Primary Examiner*—James Hook
(74) *Attorney, Agent, or Firm*—Sonnenschein Nath & Rosenthal LLP

(57) ABSTRACT

A tube plug kit for sealing the end of a tube is provided. The tube plug kit includes a tube plug having a housing member and a locking member, an insert member having a threaded end portion received within the threaded portion of the bore and an enlarged portion positioned to be drawn within the smooth portion of the longitudinal bore in response to rotation of the insert member in the longitudinal bore. The tube plug kit also includes an actuating tool and a tapered member between the enlarged portion of the insert member and the longitudinal bore of the housing member. The enlarged portion has a recess therein for receiving the actuating tool.

19 Claims, 3 Drawing Sheets

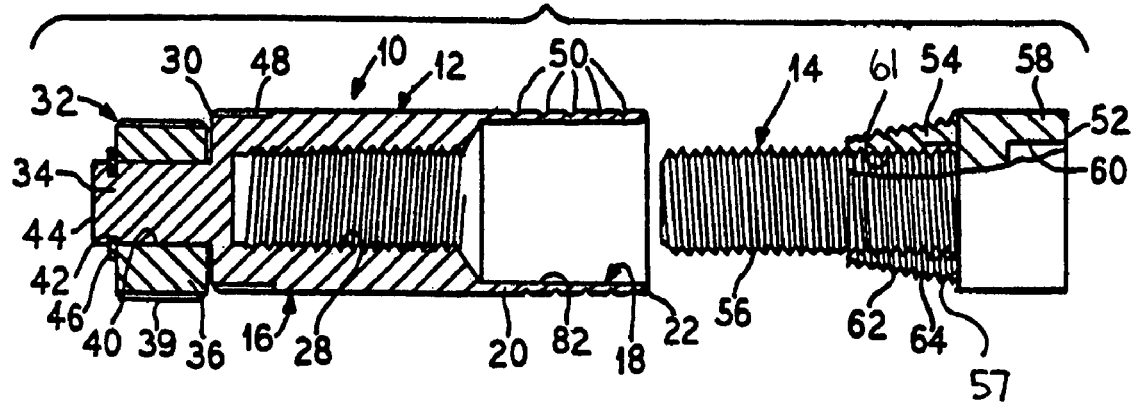
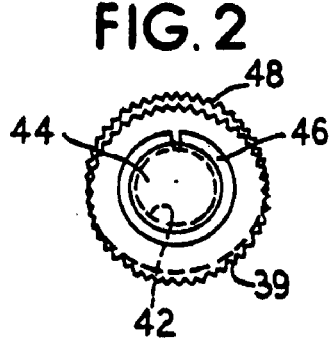
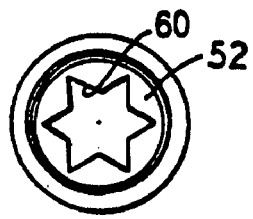
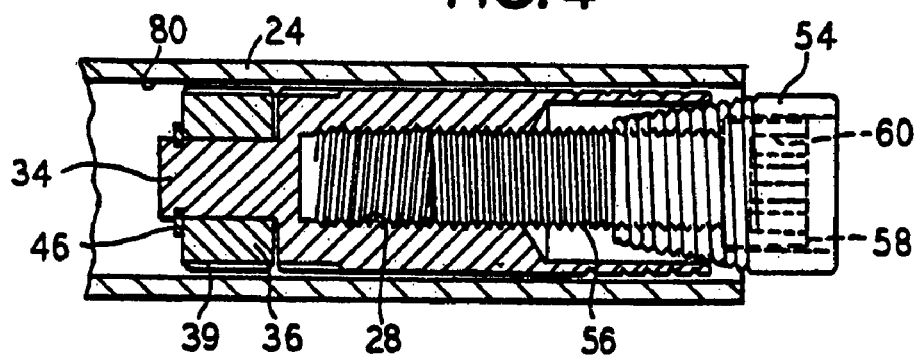
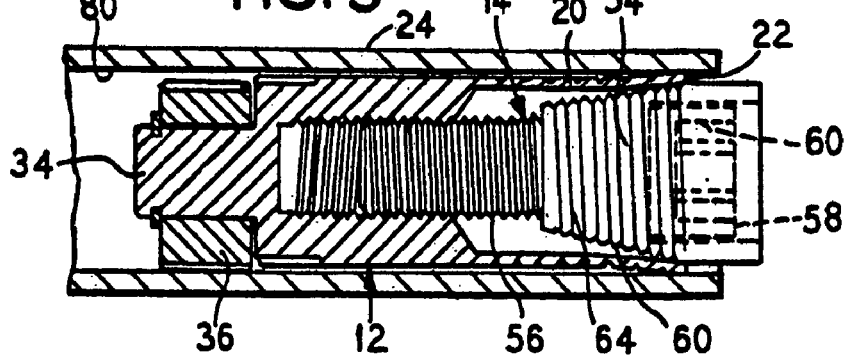

PLUG FOR HEAT EXCHANGER TUBES

BACKGROUND OF THE INVENTION

The present invention relates to improvements for a plug used to form a seal for tubes, pipes and similar conduits which transport steam, liquid or gases under pressure.

An earlier version of this type of plug commercially exploited by the present Applicant is disclosed in previous U.S. Pat. Nos. 4,653,540 and 5,289,851, the specifications of which are hereby incorporated by reference. The plug disclosed in U.S. Pat. No. 4,653,540 comprises a hollow housing member which has at one end a relatively large open bore surrounded by a thin wall, and a relatively smaller threaded bore which communicates with the larger bore. An insert member is provided which, in use, is threaded into the smaller bore thereby causing a tapered member, which may be formed on the insert member, to engage the open end of the large bore causing it to expand and bear against the wall of a heat exchanger tube into which the heat exchanger tube plug has been inserted. During use, the housing member is prevented from rotating relative to the heat exchanger tube by means of an eccentric assembly which is mounted on the end of the housing member. At the other end, the insert member has a cylindrical portion and a centrally disposed, integrally formed nut portion. The nut is proportioned to be grasped by a wrench for screwing the insert member into the housing member. The disclosure also suggests that instead of the projecting nut portion, a hexagonal recess may be formed in the end of the cylindrical portion for insertion of a hex wrench or similar tool. The insert member is specified as being integrally formed. A coil spring 34 surrounds the eccentric ring 36 to provide locking engagement against the inner surface of the heat exchanger tube.

The clutch spring on the eccentric ring was abandoned in the production model of this plug. Instead, a knurled outer surface for the eccentric ring and also short axial grooves on the plug body were added in order to prevent slipping when the eccentric cam actuated.

Also, annular grooves were added to the plug body to increase the sealing potential of the plug. If the plug was installed in a tube that had corrosion, then the raised portion of the serration would cut through any scale and would be stored in the groove thereby enhancing the mechanical contact seal.

Early on during manufacture of the plug defined in U.S. Pat. No. 4,653,540, the plugs had a machined male hex that would accommodate a 11/32 inch socket. This, however, proved unsatisfactory because the sockets split and could not be turned down to a diameter in order to fit in any tube smaller than ½ inch. This would be necessary when the plug is recessed within the end of a tube to be sealed. The next design evolution entailed broaching a ¼ inch female square drive in plugs from 460 inches to 0.610 inches in diameter and a ⅜ inch square drive in all plugs 0.620 inches and larger.

U.S. Pat. No. 5,289,851 describes a tube plug that can be provided in dimensions down to 0.420 inches, yet which permits installation torque values of up to 700 inch pounds. In this improved plug, the insert member as disclosed in U.S. Pat. No. 4,653,540, has been replaced with a T45 Torx® socket head screw combined with a separately machined cone having an internal passage threaded to match the threads of the screw. A T45 Torx® drive can be torqued to 764 inch pounds before failure which permits a recommended installation value of up to 700 inch pounds to be utilized.

In both U.S. Pat. Nos. 4,653,540 and 5,289,851 a tool is required to engage the insert member, and specifically, the recess portion or nut of the insert member, in order to screw the insert member into the housing member. Typically, the insert member includes a recess, such as a T45 Torx® socket head recess or a hexagon socket head recess, to engage the tool. However, such an arrangement creates a fair amount of slippage which can complicate the process of screwing the insert member into the housing member, especially in light of the high torsional forces that are being used. Thus, in order to reduce slippage between the tool and the recess of the insert member, an adhesive, such as a drive holding compound, may be applied to the recess or the end of the tool that engages the recess. However, applying such an adhesive is cumbersome and messy.

It would therefore be an improvement in this art if a tube plug having an insert member were provided with a tool for securely engaging the insert member without the need for an adhesive.

SUMMARY OF THE INVENTION

In one aspect of the present invention, a tube plug kit is provided. The tube plug kit includes a tube plug, an insert member, an actuating tool, and a tapered member. The tube plug has a housing member and a locking member. The housing member has a longitudinal bore that has a smooth portion communicating with a threaded portion. The locking member is mounted on the housing member. The insert member has a threaded end portion received within the threaded portion of the bore and an enlarged portion positioned to be drawn within the smooth portion of the longitudinal bore in response to rotation of the insert member in the longitudinal bore. The actuating tool including a head. The head has a compression member for engaging the insert member. The tapered member is between the enlarged portion of the insert member and the longitudinal bore of the housing member. The enlarged portion has a recess therein for receiving the head. This new design allows for a tube plug that can be provided in dimensions down to 0.250 inches in diameter, yet which permits installation.

In one aspect of the present invention, a tube plug kit for sealing an end portion of a tube is provided. The kit includes a tube plug, an insert member, an actuating tool, and a tapered member. The tube plug has a housing member and a locking member. The housing member is sized for insertion within the end portion of the tube. The housing member has a longitudinal bore comprising a smooth portion communicating with a threaded portion. The locking member connects with the housing member for locking the inserted housing member against rotation relative to the tube. The insert member has a threaded end portion received within the threaded portion of the bore and an enlarged portion positioned to be drawn within the smooth portion of the bore in response to rotation of the insert member in the housing member. The tapered member is between the enlarged portion of the insert member and the longitudinal bore of the housing member. The enlarged portion has a recess therein for receiving the actuating tool. The tapered member is formed separately from the insert member in the form of a truncated cone with a bore therethrough for receiving the threaded end portion of the insert member. The tapered member and the enlarged portion are sized to cause the smooth portion of the bore to expand, thereby providing a seal between the housing member and the tube.

In one aspect of the present invention, a tube plug kit for sealing an end of a tube is provided. The tube plug kit includes a body portion, locking means, an insert member, an actuating tool, and a separately formed tapered member. The body portion is sized to be received within the tube with a minimum of clearance. The body portion has a friction enhancing outer surface and a central bore therein with a portion of the bore having a smooth inner surface and a smaller radiused portion having an internal thread. The locking means comprises an eccentric ring rotatably mounted on a post projecting axially from an end of the body portion to prevent the body portion from rotating within the tube. The ring has a friction enhancing external cylindrical surface. The insert member comprises a headed screw having a threaded portion threadingly received within the threaded bore portion of the body portion. The actuating tool includes a head, wherein the head includes a compression member for engaging the insert member. The tapered member is for engaging with the smooth bore portion of the body portion. The tapered member has a frustoconical member with a bore therethrough for engaging with the threaded portion of the insert member. The insert member has a driving recess in an end thereof opposite the threaded portion for receiving the head. The the tapered member and the enlarged portion are sized to cause the smooth portion of the bore to expand upon threaded insertion of the insert member into the body portion, thereby providing a seal between the body portion and the tube.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 is an exploded view of a heat exchanger tube plug made in accordance with the present invention, with the plug shown substantially in cross section, in accordance with one embodiment;

FIG. 2 is a left elevational end view of the apparatus of FIG. 1, in accordance with one embodiment;

FIG. 3 is an elevated right end view of the apparatus of FIG. 1, in accordance with one embodiment;

FIG. 4 is a cross-sectional view of the apparatus of FIG. 1 with the apparatus shown assembled and inserted into the end of a boiler tube, in accordance with one embodiment;

FIG. 5 is a cross-sectional view similar to FIG. 4 with the apparatus shown sealing the end of a boiler tube, in accordance with one embodiment;

DETAILED DESCRIPTION OF THE PREFERRED EMBODIMENTS

Figure 6:
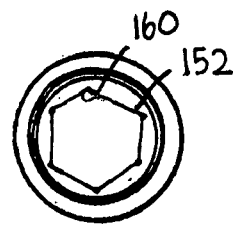
FIG. 6 is an elevated right end view of the apparatus of FIG. 1, in accordance with one embodiment.

The present invention relates to a tube plug kit. The tube plug kit includes a tube plug having a housing member and a locking member. The housing member has a longitudinal bore that has a smooth portion in communication with a threaded portion. The locking member is mounted on the housing member for locking the inserted housing member against rotation relative to a tube. The tube plug kit also includes an insert member having a threaded end portion received within the threaded portion of the bore and an enlarged portion positioned to be drawn within the smooth portion of the longitudinal bore in response to rotation of the insert member in the longitudinal bore. The kit also includes an actuating tool and a tapered member between the enlarged portion of the insert member and the longitudinal bore of the housing member. The enlarged portion has a recess therein for receiving the actuating tool. Since the tube plug kit uses an actuating tool, the kit does not require the use of an adhesive for securely engaging the insert member.

In FIG. 1 a boiler tube plug 10 is shown which is made in accordance with the present invention. The plug 10 comprises a hollow housing member 12 and an insert member 14. The housing member 12 has a cylindrical body 16, the rear portion of which is formed with a large open bore 18. The bore 18 is surrounded by relatively thin wall 20, the end portion 22 of which will expand outwardly to provide a seal for a boiler tube as is shown in FIG. 5, when the insert member 14 is screwed into the housing member 12. The housing member 12 also includes a relatively smaller internally threaded cylindrical bore 28 which communicates with the large bore 18.

At its front end 30, the housing member 12 is provided with a locking member 32 which serves to lock the housing member tightly within the boiler tube 24, as is shown in FIGS. 4 and 5, so that the insert member 14 can be screwed into the housing member 12. In one embodiment, the locking member 32 includes an eccentric assembly that comprises a cylindrical post 34 which projects axially from the front end 30 of the housing member 12, a ring member 36 which is mounted eccentrically on the post and is rotatable thereon, as shown in FIG. 2. As is shown in FIGS. 1 and 2, the post 34 is disposed eccentrically relative to a longitudinal axis of the housing member 12.

An outer cylindrical surface 39 of the ring member 36 is serrated or knurled in order to provide enhanced frictional gripping between the ring 36 and the tube 24. The ring member 36 has a bore 40 which fits rotatably over the post 34. The post has a groove 42 near a distal end 44 thereof for receiving a locking snap ring 46. This snap ring retains the ring 36 on the post 34.

The housing member 12 has a series of axial grooves 48 at the end adjacent to the ring member 36 for enhancing frictional gripping of the housing member 12 to the tube 24 to prevent continued rotation of the housing member 12 within the tube. The outer surface of the housing member 12 also includes a plurality of annular grooves 50 adjacent to the open bore 18 of the housing member to enhance the sealing characteristics of the plug as described below.

The insert member 14 is comprised of a headed cap screw 52 and a tapered member 54. In one embodiment, the screw 52 is a Torx® socket head screw having a threaded shank 56 and an enlarged head 58 with a driving recess 60 formed in the head. While a Torx® socket screw comprises one embodiment, other types of recess drive apertures are known. In one embodiment, the screw 52 is a hexagon socket screw 152 having a hexagon socket recess 160, as illustrated in FIG. 6.

Figure 7A:
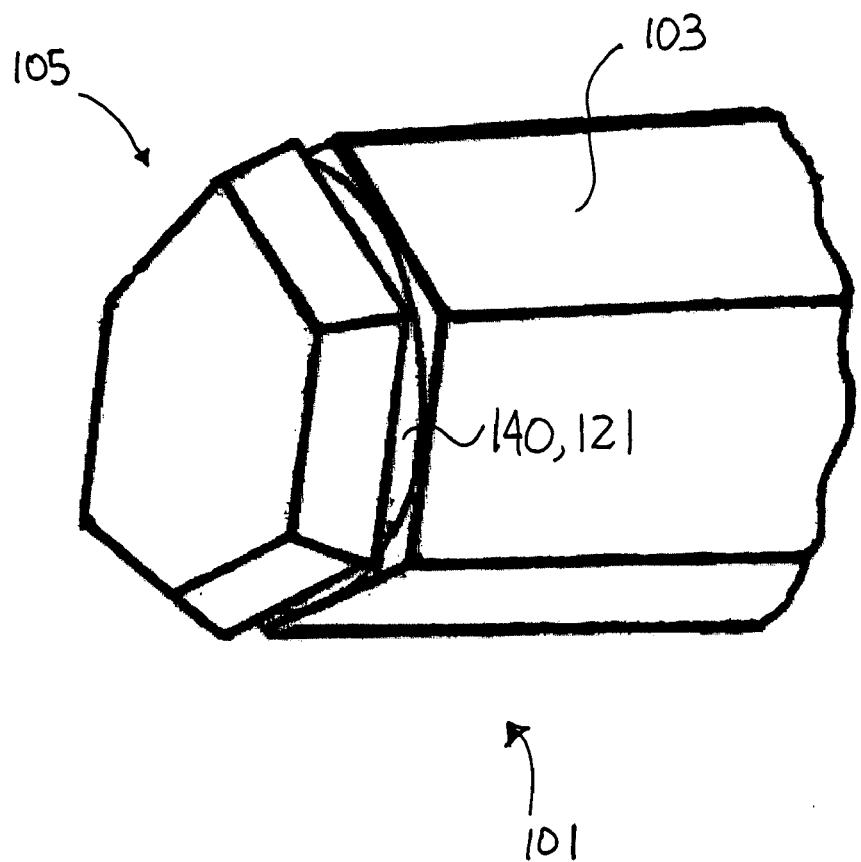
FIG. 7A is a perspective view of an actuating tool, in accordance with one embodiment.
Figure 7B:
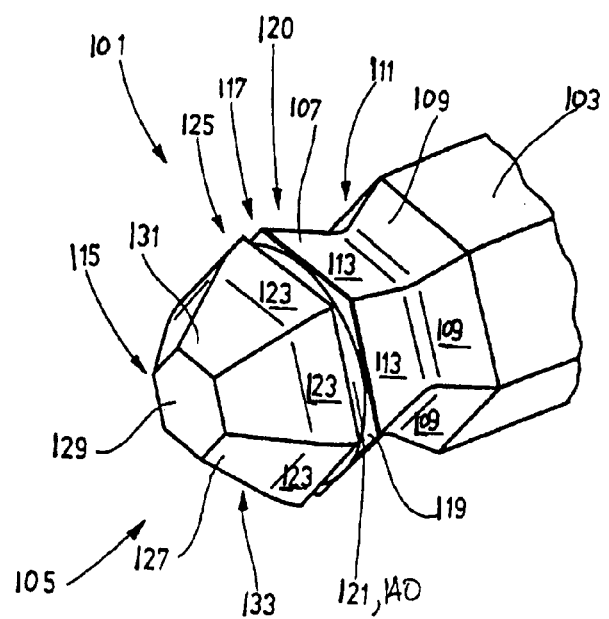
FIG. 7B is a perspective view of an actuating tool, in accordance with one embodiment.

An appropriate tool is used to engage driving recess 60 and to tighten or untighten the screw 52. In one embodiment, the tool is an actuating tool 101 that is used to tighten or untighten the screw 52. The actuating tool 101 includes a socket screw wrench for a fastener with an internal hexagon socket arrangement, particularly a hexagon socket screw. This internal polygon arrangement can of course also have a different number of corners. Preferably, the actuating tool 101 has a spherical-type tool head. The tool head may of course also be made in the form of a cylinder. FIGS. 7A and 7B depicts an actuating tool 101. As shown in FIG. 7A, the actuating tool 101 includes a cylindrical hexagon shank 103, which at its one end is provided with a tool head 105. The tool head 105 includes a compression member 140 that flexes and engages at least a portion of the recess 60 of the screw 52. In this manner, the actuating tool 101 is able to more securely engage the recess 60 than a conventional tool. In one embodiment, the compression member 140 includes a spring washer 121, as described below.

In one embodiment, the tool head 105 is made as a spherical hexagon head with an external hexagon arrangement 107, as illustrated in FIG. 7B. Hexagon tool head 105 is integrally formed with shank 103, whereby shank 103 comprises beveled faces 109 that slope toward a center axis of the tool so as to form a constriction 111. In the area of constriction 111, tool head 105 adjoins with faces 113, which increase toward an end 115 of tool head 105, i.e. their distance to the longitudinal axis of actuating tool 101 increases. In the further course of tool head 105, a recess 117 is provided, which is realized as a substantially rectangular or U-shaped groove 119, also referred to as neck. In the area between constriction 111 and groove 119, tool head 105 is formed by a first spherical segment 120. Groove 119 accommodates a spring washer 121. In the further course of the tool head, toward end 115, outwardly curved faces 123 sloping toward the center axis of actuating tool 101 adjoin groove 119. Faces 123 are the outer faces of a second spherical segment 125 of tool head 105 to which a truncated cone 127 is attached. The truncated cone 127 with its truncated face 129 forms the end 115 of the actuating tool 101. The truncated cone, along its lateral surface 131, is provided with a polygon arrangement, particularly a hexagon arrangement 133. It is apparent from FIG. 7B that the external hexagon arrangement 107, or tool head 105, is formed by the first spherical segment 120, the second spherical segment 125, and the truncated cone 127. In other words, faces 113 of the first spherical segment 114, faces 123 of the second spherical segment 125, and the lateral surface 131 each merge into each other. The actuating tool 101 is described in further detail in U.S. Pat. No. 6,302,001, the entire specification of which is hereby incorporated by reference.

Figure 8:
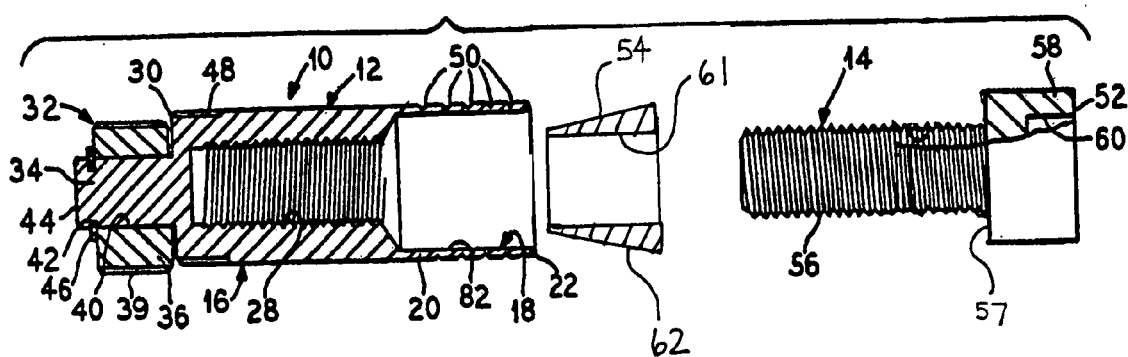
FIG. 8 is an exploded view of a heat exchanger tube plug made in accordance with the present invention, with the plug shown substantially in cross section, in accordance with one embodiment.

The tapered member 54 has an internal passage 61 which is made to receive the external thread of the shank 56 of the screw 52, as illustrated in FIGS. 1 and 8. In one embodiment, the internal passage 61 is threaded to mate with the external thread of the shank 56 of screw 52, as illustrated in FIG. 1. In one embodiment, the internal passage 61 is a smooth surface, as illustrated in FIG. 8. The tapered member 54 may either extend up to and abut a surface 57 of a head 58 of the screw as shown in FIG. 1, particularly for smaller radius insert members 14, or it may have an outer diameter greater than the diameter of the head 58 such that the tapered member 54 will surround the head as illustrated in FIGS. 4 and 5. The tapered member 54 includes an outer surface 62 that engages the mouth of the large bore 18. Preferably, the outer surface 62 is generally shaped like a frustoconical member, as illustrated in FIG. 1. In one embodiment, the outer surface 62 has a spiral groove 64 therein, as illustrated in FIG. 1. In another embodiment, the outer surface 62 does not have a spiral groove 64 therein, as illustrated in FIG. 8.

In one embodiment, the tapered member 54 is separate and apart from the housing member 12 and/or the insert member 14, as illustrated in FIGS. 1 and 8. In one embodiment, the tapered member 54 is integrally formed with the housing member 12 or the insert member 14.

Although the insert member 14 could be made as an integral part, since these socket head screws are readily available commercial items, machining of the tapered member 54 permits a substantial savings in machine time over integral formation of the insert member 14. The threaded shank 56 of the insert member 14 is sized to be received in the threaded smaller bore 28 of the housing member 12.

In use, the assembled insert member 14 is inserted into the housing member 12 and the threaded shank 56 is inserted through the internal passage 61 and screwed into the threaded bore 28 until the outer surface 62 of the tapered member 54 engages the mouth of the large bore 18 and the insert member 14 can no longer be turned by hand. The eccentric ring member 36 is rotated relative to the post 34, by hand, until it is approximately concentric with the body of the housing member 12. In this condition, the plug 10 is sized so that it may be inserted into the end of a heat exchanger tube 24 to the position shown in FIG. 4, although the clearances between the plug and the tube wall is less than the exaggerated showing in FIGS. 4 and 5.

The driving recess 60 is then engaged with an appropriate tool, as described above, which causes the ring member 36, which engages the sidewalls of the heat exchanger tube with its knurled surface, to turn on the post 34 toward the eccentric position shown in FIG. 2. The ring member 36 thus presses tightly against an inner surface 80 of the heat exchanger tube 24 so that the ring member 36 can no longer turn on the post 34 and the housing member 12 is tightly locked against turning within the heat exchanger tube 24.

When the drive recess 60 is further turned by the appropriate tool, the insert member 14 turns within the housing member 12, with the threaded shank 56 screwing further into the small bore 28. At the same time, the outer surface 62 engages an inner surface 82 of the large bore 18 and as the increasing diameter of the tapered member 54 enters the large bore 18, it deforms the surrounding thin wall 20 of the housing member 12 outwardly, increasing its diameter as shown in FIG. 5. As the diameter of the thin wall 20 increases, the expanded end portion 22 engages the inner surface 80 of the heat exchanger tube 24 and makes an effective seal therewith. The annular grooves 50 increase the sealing potential of the plug. If the tube 24 has any corrosion on its inner surface 80, the raised portions between the annular grooves 50 would cut through any scale and the scale would be retained in the grooves 50, thereby enhancing the mechanical contact seal. Since an actuating tool 101 is used to securely engage the insert member 14, adhesive is not required.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

What is claimed is:

1. A tube plug kit comprising:
   a tube plug having a housing member and a locking member, the housing member having a longitudinal bore comprising a smooth portion communicating with a threaded portion, the locking member mounted on the housing member;

an insert member having a threaded end portion received within the threaded portion of the bore, an enlarged portion positioned to be drawn within the smooth portion of the longitudinal bore in response to rotation of the insert member in the longitudinal bore;

an actuating tool including a head, wherein the head includes a compression member for engaging the insert member and for transmitting torque at levels greater than 450 inch pounds; and a tapered member between the enlarged portion of the insert member and the longitudinal bore of the housing member, the enlarged portion having a recess therein for receiving the head.

2. A tube plug kit according to claim 1, wherein the tapered member and the enlarged portion are sited to cause the smooth portion of the longitudinal bore to expand.

3. A tube plug kit according to claim 1, wherein the locking member comprises an eccentric ring rotatably mounted on a post projecting axially from an end of the housing member.

4. A tube plug kit according to claim 3, wherein the eccentric ring is held on the post by means of a retaining ring received in an annular groove on the post.

5. A tube plug kit according to claim 1, wherein the housing member has a friction enhancing outer surface.

6. A tube plug kit according to claim 1, wherein the insert member comprises a headed screw member and the tapered member comprises a frustoconical member which is threadingly received on the headed screw member.

7. A tube plug kit according to claim 6, wherein the frustoconical member abuts against an underside of the head of the screw.

8. A tube plug kit according to claim 1, wherein the housing member includes a plurality of external annular grooves thereon surrounding the smooth bore portion.

9. A tube plug kit for sealing an end portion of a tube, comprising:

a tube plug having a housing member and a locking member, the housing member sized for insertion within the end portion of the tube, the housing member having a longitudinal bore comprising a smooth portion communicating with a threaded portion, the locking member connecting with the housing member for locking the inserted housing member against rotation relative to the tube;

an insert member having a threaded end portion received within the threaded portion of the bore, an enlarged portion positioned to be drawn within the smooth portion of the bore in response to rotation of the insert member in the housing member;

an actuating tool including a head, wherein the head includes a compression member for engaging the insert member and for transmitting torque at levels greater than 450 inch pounds; and a tapered member between the enlarged portion of the insert member and the longitudinal bore of the housing member, the enlarged portion having a recess therein for receiving the actuating tool, the tapered member being formed separately from the insert member in the form of a truncated cone with a bore therethrough for receiving the threaded end portion of the insert member, and the tapered member and the enlarged portion being sized to cause the smooth portion of the bore to expand, thereby providing a seal between the housing member and the tube.

10. A tube plug kit according to claim 9, wherein the locking member comprises an eccentric ring rotatably mounted on a post projecting axially from an end of the housing member.

11. A tube plug kit according to claim 10, wherein the actuating tool includes a head, and wherein the head includes a compression member for engaging the recess.

12. A tube plug kit according to claim 10, wherein the ring is held on the post by means of a retaining ring received in an annular groove on the post.

13. A tube plug kit according to claim 10, wherein the housing member includes a plurality of annular grooves thereon surrounding the smooth bore portion.

14. A tube plug kit according to claim 9, wherein the housing member has a friction enhancing outer surface.

15. A tube plug kit according to claim 9, wherein the insert member comprises a headed screw member and the truncated cone of the tapered member abuts against a head of the headed screw member.

16. A tube plug kit according to claim 15, wherein the truncated cone abuts and terminates against an underside of the head of the screw member.

17. A tube plug kit according to claim 15, wherein the truncated cone has an outer diameter at a larger end which is greater than a diameter of the screw head and the screw head is recessed within the headed screw member.

18. A tube plug kit according to claim 9, wherein the enlarged portion has a recess therein for receiving the actuating tool and for transmitting torque at levels greater than 300 inch pounds.

19. A tube plug kit for sealing an end of a tube comprising:

a body portion sized to be received within the tube with a minimum of clearance, the body portion having a friction enhancing outer surface and a central bore therein with a portion of the bore having a smooth inner surface and a smaller radiused portion having an internal thread;

locking means comprising an eccentric ring rotatably mounted on a post projecting axially from an end of the body portion to prevent the body portion from rotating within the tube, the ring having a friction enhancing external cylindrical surface;

an insert member comprising a headed screw having a threaded portion threadingly received within the threaded bore portion of the body portion;

an actuating tool including a head, wherein the head includes a compression member for engaging the insert member and for transmitting torque at levels greater than 450 inch pounds; and a separately formed tapered member for engaging with the smooth bore portion of the body portion, the separately formed tapered member comprising a frustoconical member with a bore therethrough for engaging with the threaded portion of the insert member, the insert member having a recess in an end thereof opposite the threaded portion for receiving the head, and the tapered member and the enlarged portion being sized to cause the smooth portion of the bore to expand upon threaded insertion of the insert member into the body portion, thereby providing a seal between the body portion and the tube.

* * * * *